United States Patent [19]
Stamp et al.

[11] Patent Number: 5,302,301
[45] Date of Patent: Apr. 12, 1994

[54] MULTISTAGE LIQUID AND GAS SEPARATOR

[75] Inventors: Jeffrey Stamp, Emsworth; Eric C. Bula, Fareham, both of England

[73] Assignee: Pall Corporation, Glen Cove, N.Y.

[21] Appl. No.: 899,886

[22] Filed: Jun. 17, 1992

[30] Foreign Application Priority Data

Jun. 18, 1991 [GB] United Kingdom ............... 9113165

[51] Int. Cl.⁵ ..................... B01D 45/12; B01D 19/00
[52] U.S. Cl. ............................ 210/787; 210/348; 210/512.1; 55/337; 55/459.1
[58] Field of Search ............... 210/348, 304, 512.1, 210/787; 55/337, 459.1

[56] References Cited

U.S. PATENT DOCUMENTS

| | | |
|---|---|---|
| 3,707,068 | 12/1972 | Bloom ............................. 55/337 |
| 3,853,518 | 12/1974 | Tu et al. . | 
| 3,953,184 | 4/1976 | Stockford et al. . |
| 4,872,890 | 10/1989 | Lamprecht et al. ............... 55/323 |
| 4,941,900 | 7/1990 | Cordes ............................ 55/319 |
| 5,053,126 | 10/1991 | Krasnoff ........................ 55/337 |

FOREIGN PATENT DOCUMENTS

| | | |
|---|---|---|
| 0353903 | 7/1989 | European Pat. Off. . |
| 1146993 | 8/1960 | United Kingdom . |
| 1208789 | 11/1968 | United Kingdom . |
| 1578706 | 5/1978 | United Kingdom . |
| 2096026 | 3/1982 | United Kingdom . |

Primary Examiner—Robert A. Dawson
Assistant Examiner—David Reitsnyder
Attorney, Agent, or Firm—Leydig, Voit & Mayer

[57] ABSTRACT

A separator which can be used for separating water from an air/water mixture in an aircraft where the air is to be supplied to electronics equipment comprises a chamber containing a generally tangential inlet tube through which a mixture is supplied to a curved side wall section of the chamber to separate water from the air by centrifical action. The efficiency of the unit is improved either by moving the filter unit away from the center of the chamber or by providing a guide plate between the filter unit and the curved side wall on which the water coalesces. In this latter case, the filter unit can also be offset from the center of the chamber to give even greater improvement and efficiency.

14 Claims, 2 Drawing Sheets

MULTISTAGE LIQUID AND GAS SEPARATOR

BACKGROUND OF THE INVENTION

1. Field of the Invention

The invention relates to separators for separating a liquid from a liquid/gas mixture. It can also be used when such a mixture contains particulates.

The need for such a separator arises in aircraft where air is taken from the exterior of the aircraft fusilage to cool electronics equipment within the fusilage. In wet conditions, such air can contain water and it is essential that all water is removed before the air reaches the electronic equipment. The air can also contain particulates such as dust and soot and it is equally important that they be removed.

2. Brief Review of the Prior Art

A previous proposal for separating water from air in such circumstances has been the provision of an inlet leading to a coalescer in the form of a vertically arranged mesh on which water droplets coalesce into larger drops which then fall to the periphery of the mesh for extraction. A pleated cylindrical filter medium is provided downstream of the coalescer to filter out solids. The outlet to the filter unit is for connection to electronics equipment to be cooled.

It has been found that such a separator does not work satisfactorily because the coalescer does not always remove sufficient of the water droplets, so that air passing to the filter unit is heavily laden with water droplets. The filter medium used in the filter is not of a size to remove such water droplets and so water can pass to the outlet, which is plainly undesirable.

SUMMARY OF THE INVENTION

According to a first aspect of the invention there is provided an apparatus for separating a liquid from a liquid/gas mixture comprising a chamber having opposed end walls and a side wall extending between the end walls, an inlet provided in the side wall for directing the mixture towards a curved section of the side wall extending from the inlet to separate the liquid from the mixture by centrifugal force, a filter unit provided in the chamber for filtering the air and offset from the centre of the chamber, a liquid outlet for separated liquid and an air outlet leading from the filter unit.

According to a second aspect of the invention, there is provided apparatus for separating a liquid from a liquid/gas mixture comprising a chamber having opposed end walls and a side wall extending between the end walls, an inlet provided in the side wall for directing a mixture towards a curved section of the side wall extending from the inlet, a guide surface being arranged within the chamber and extending from a point on the side wall to define with the curved surface section a passage within the chamber for the mixture leading from the inlet and in which passage the liquid in the mixture can coalesce on the passage surface, the guide surface terminating at a point in the chamber spaced from the side wall to provide an outlet to the passage, and a filter unit for separated air being provided in the chamber and located on a side of the guide surface opposite to said passage for communicating with a chamber outlet for filtered separated gas.

It has been found that, with an apparatus according to the invention used with an air/water mixture, a very high proportion of the water is coalesced before the mixture reaches the filter unit. This can allow very high efficiencies of water removal to be achieved and can also assist in the removal of particulates, where present.

The following is a more detailed description of the embodiment of the invention, by way of example, reference being made to the accompanying drawings in which:

DESCRIPTION OF THE PREFERRED EMBODIMENTS

Figure 1:
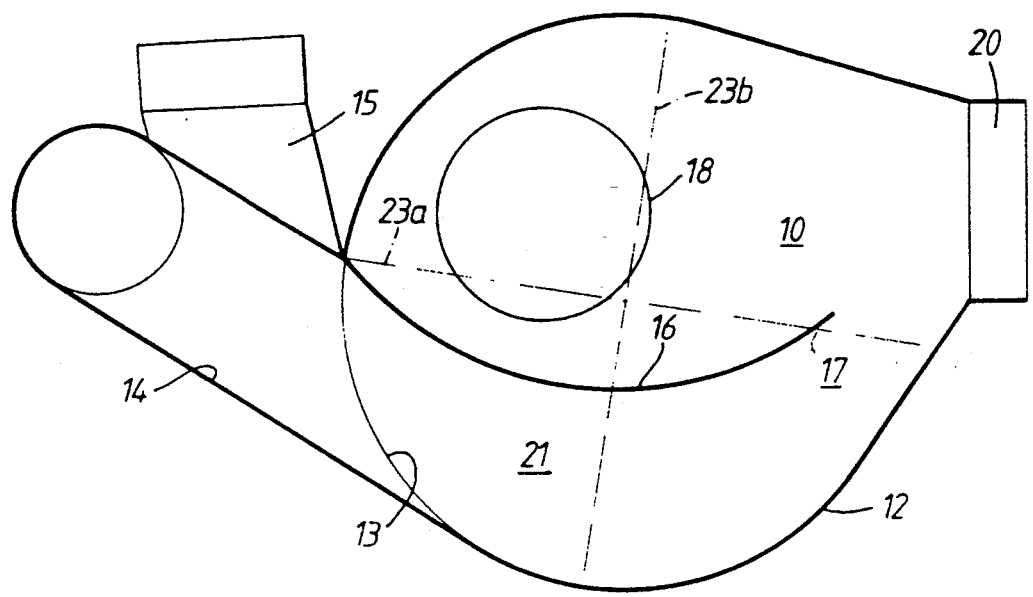
FIG. 1 is a schematic view of a separator for separating water from air with the supply of air to electronics equipment of an aircraft, with an end wall of the apparatus removed to show the interior of a chamber of the apparatus.

Referring to the drawings, the apparatus comprises a chamber 10 formed by generally circular end walls 11 (one of which is omitted for clarity in FIG. 1) and a generally cylindrical side wall 12 extending between the end walls. The side wall 12 is formed with an inlet 13 to which is connected an inlet tube 14. The inlet tube 14 is directed towards the side wall 12 (see FIG. 1) and towards one end wall 11 (see FIG. 2).

A branch tube 15 is provided for connection to an alternative supply.

A guide plate 16 is provided within the chamber 10 and is of arcuate shape about an axis parallel to the axis of the cylindrical side wall 12. The guide plate 16 extends from the side wall 12 at a point adjacent the end of the inlet 17 in a circumferential direction and is arranged between the axis of the cylindrical side wall 12 and the portion of the cylindrical side wall leading from the inlet 13. The guide plate 16 terminates within the chamber at a point spaced from the side wall 12.

The guide plate 16 and the adjacent section of a side wall 12, together with the end walls 11 thus form a passage 21 which extends around the interior of the chamber 10 from the inlet 13 to an outlet 17 formed between the end of the guide plate 16 and the side wall 12. As best seen in FIG. 1, this passage at first diverges and then converges towards the outlet 17.

A filter unit 18 is also provided within the chamber. The filter unit 18 is generally cylindrical in shape with its axis parallel to the axis of the cylindrical side wall 12. The filter unit 18 is of conventional design containing a pleated filter element arranged around a cylindrical interior space which leads to an outlet 19 provided in one end wall 11 and communicating with an outlet passage 20.

The filter element of the filter unit 18 is preferably hydrophobic and may have an absolute rating of 5 microns.

There are a number of possible alternative positions for the filter unit 18 and only one such is illustrated in the Figures. In FIG. 1, it will be seen that the inlet 13 and the passage 21 are located in two adjacent quadrants of the space defined by the cylindrical side wall 12. The axis of the filter unit 18 is located in a third quadrant adjacent to the quadrant containing the inlet. This axis may be anywhere within this quadrant including being located on either of the radii 23a, 23b defining the quadrant.

In use, the inlet tube 14 is connected to an aperture on an aircraft fusilage. The separator is arranged with the axis of the chamber 10 vertical and the drain 22 lowermost. The outlet passage 20 is connected to electronics equipment within the fusilage to be cooled. Assuming that the air outside the fusilage is laden with water, a mixture of air and water (possibly with the addition of particulates such as soot and dust) enters the inlet tube 14. The mixture is then directed against the end wall 11 and the side wall 12 and is thrown by centrifugal force around the curvature of the side wall 12. At the same time, because of the divergent nature of the first portion of the passage 21, velocity of the air reduces. This assists in coalescing water droplets in the air on the surfaces of the passage 21 formed by the side wall 12, the guide plate 16 and the end walls 11.

Figure 2:
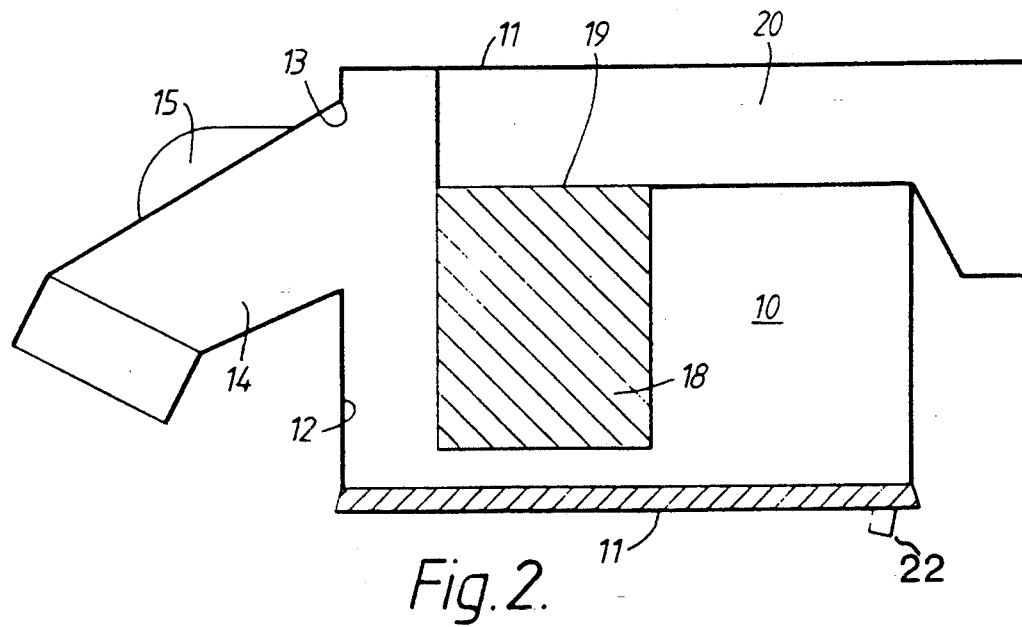
FIG. 2 is a schematic sectional view of the apparatus of FIG. 1.

Such coalesced water continues around the side wall 12 and out of the outlet 19 to collect by gravity at the lowest point of the chamber where it is removed through a drain 22 (see FIG. 2). The length of the guide plate 16 is preferably such that water does not drip off the trailing edge of the plate 16.

The air continues to the filter unit 18 with any residual water droplets in the air being repelled by the hydrophobic filter medium in the filter unit 18. The filter medium will also tend to remove particulates that have not coalesced with the water.

Air leaving the outlet passage 20 is thus substantially free from water and particulates and is passed to the electronics equipment.

Figure 3:
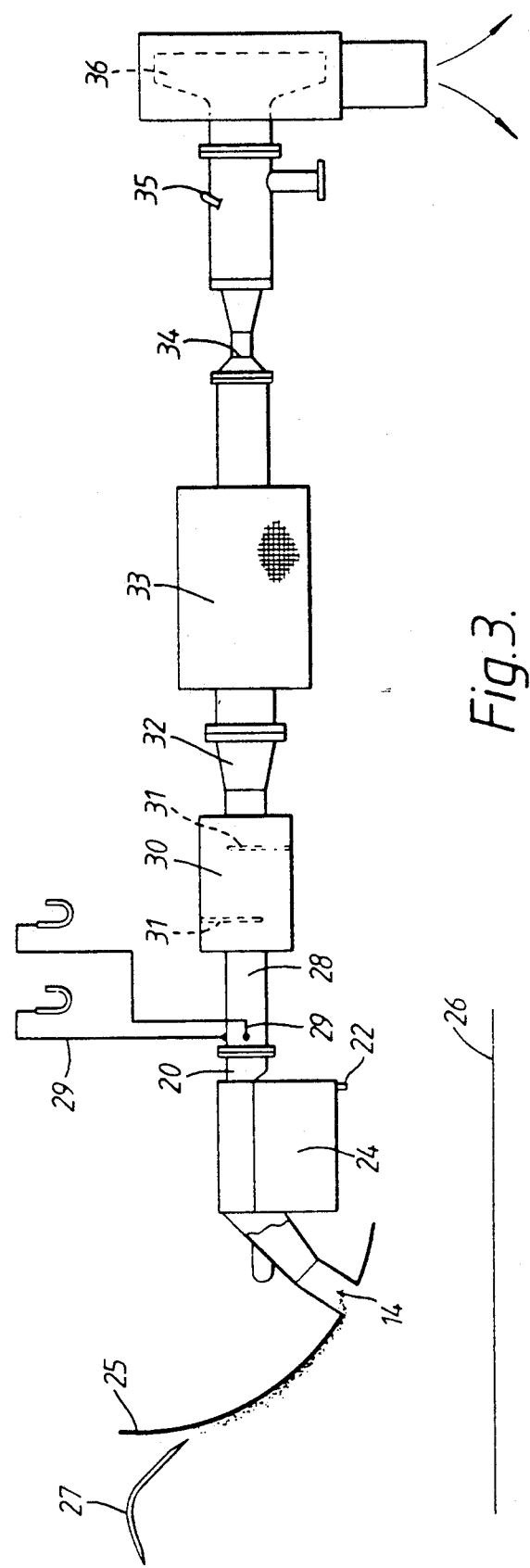
FIG. 3 is a schematic view of a test rig for testing an apparatus of the kind shown in FIGS. 1 and 2.

A separator of the kind described above with reference to the drawings has been tested using the test rig shown in FIG. 3.

The test rig comprises a curved plate 25 having a radius of 3.96 meters which simulates an aircraft fusilage. At a point on the exterior of the fusilage 1.83 meters above the ground 26, a pipe 27 at an angle of 45° to the horizontal sprays water droplets at a rate of 450 l/hr and at a spray angle of 35° on to the surface of the plate 25. The end of the inlet tube 14 of the separator 24 is arranged on the surface of the plate 25 at a point 0.3 meters above the ground and is followed by the remainder of the separator 24 described above with reference to FIGS. 1 and 2. The outlet passage 20 of the separator 24 is connected to a measuring section 28 provided with manometers 29 for measuring the pressure drop. The measuring section 28 is connected to a coalescer 30 in the form of a chamber of substantial volume with internal baffle plates 31. An outlet 32 to the coalescer 30 is connected to a dust collection plenum chamber 33 whose outlet is in turn connected to a mass flow measuring section 34, a flow control valve 35 and a fan 36 which draws air through the test rig at a rate of 1.25 kg/s.

The efficiency of the apparatus 24 is measured by comparing the volume of water provided by the pipe 27 with the volume of water in the coalescer 30. In addition, the accountability of the system (which represents the accuracy of the measurement of the efficiency) is determined by collecting the water fed by the pipe 27 but not ingested by the apparatus 24, water drained from the drain 22, the difference in weight of the filter unit 18 before and after the test, and water collected in the coalescer 30, and comparing it with the water supplied by the pipe 27. It will be appreciated that the higher the accountability percentage the more accurate is the efficiency measurement.

The separator 24 was tested in five configurations as follows:
1. With the guide plate 16 removed and the filter unit 18 arranged with its axis coaxial with the axis of the cylindrical side wall 12.
2. As test 1, but with the guide vane.
3. As test 2, but with the axis of the filter unit offset laterally from the axis of the cylindrical side wall (i.e. along the radius 23a).
4. As test 3, but with the axis of the filter unit 18 offset both laterally and longitudinally with respect to the axis of the cylindrical side wall 12 (i.e. in the position shown in FIG. 1).
5. As test 4, but with the filter element containing a hydrophobic filter medium.
6. As test 3, but with the guide vane removed.

The results of these tests are set out below.

| Filter element position and vane incorporation | Efficiency | Accountability |
| --- | --- | --- |
| 1. Central, no vane | 46% | 95% |
| 2. Central with vane | 80% | 98% |
| 3. Offset laterally with vane | 87% | 94% |
| 4. Offset laterally and longitudinally with vane | 96% | 98% |
| 5. As for 4 above with hydrophobic treatment | 97.2% | 98.5% |
| 6. As for 3, but with vane removed | 85% | 98% |

It will be seen that a significant improvement is achieved by the provision of the vane. Offsetting the filter unit laterally achieves an additional improvement and offsetting it laterally and longitudinally, to the position shown in FIG. 1, provides an even greater improvement. When the filter medium is additionally treated to make it hydrophobic, a further improvement is obtained. Even if the vane is omitted, offsetting the filter unit laterally produces a significant improvement.

It will be appreciated that the separator described above with reference to the drawings could be modified in a number of ways.

The side wall 12 of the chamber 10 need not be cylindrical; it could be formed simply by a curved surface extending along the length of the passage to produce a centrifugal effect. The remainder of the side wall 12 could be of some other shape. Of course, the curvature of the side wall 12 need not be a cylindrical or part-cylindrical curvature, it could be any other suitable curvature.

The guide plate 16 need not be an arc of a circle in a cross-section; it too could be of any suitable curvature. As mentioned above, it has been found that improved results can be achieved by omitting the guide plate 16 and simply positioning the filter unit 18 away from the centre of the chamber 10 towards the inlet 13. This positioning need not just be lateral positioning, it could be any advantageous positioning away from the centre of the chamber.

The separator need not be used for separating water from air; it could be used for separating any suitable liquid/gas mixture.

We claim:
1. An apparatus for separating a liquid from a liquid/gas mixture comprising a chamber having opposed end walls and a side wall extending between the end walls, an inlet provided in the side wall for directing the mix- ture towards a curved section of the side wall extending from the inlet to separate the liquid from the mixture by centrifugal force, a filter unit provided in the chamber for filtering the air and offset from the center of the chamber, a liquid outlet for separated liquid, and an air outlet leading from the filter unit.

2. An apparatus according to claim 1 and further including a guide surface arranged within the chamber and extending from a point on the side wall such that the guide surface and the curved section define a passage for the mixture within the chamber leading from the inlet and in which liquid in the mixture coalesces on the passage surface, the guide surface terminating at a point in the chamber spaced from the side wall to provide an outlet to the passage.

3. An apparatus according to claim 1 including an inlet tube connected to the inlet and extending in a direction towards said curved section of the side wall and towards one end wall.

4. An apparatus according to claim 1 wherein the filter unit comprises a pleated cylinder of hydrophobic filter medium.

5. A method for separating water from an air/water mixture comprising passing the air/water mixture through the apparatus according to claim 1.

6. A method according to claim 5 further comprising removing at least 85% of the water from the air/water mixture at an accountability of at least 94%.

7. An apparatus for separating a liquid from a liquid gas mixture comprising a chamber having opposed end walls and a side wall extending between the end walls, an inlet provided in the side wall, an inlet tube connected to the inlet for directing the mixture towards a curved section of the side wall extending from the inlet, a guide surface arranged within the chamber and extending from a point on the side wall to define with the curved surface section a passage within the chamber for the mixture leading from the inlet and in which passage the liquid in the mixture can coalesce on the passage surfaces, the guide surface terminating at a point in the chamber spaced from the side wall to provide an outlet for the passage, and a filter unit for separated air provided in the chamber and located on a side of the guide surface opposite to said passage and communicating with a chamber outlet for filtered separated gas.

8. An apparatus according to claim 7 wherein the axis of the filter unit is arranged closer to the inlet than to the passage outlet.

9. An apparatus according to claim 7 wherein the curved section of the side wall is a portion of a cylinder and the filter unit is generally cylindrical with an axis parallel to the axis of the side wall, the inlet and the passage being located in two adjacent quadrants of the space defined by the cylinder of which the side wall section is a portion and the axis of the filter unit being located in a third quadrant adjacent the quadrant containing the inlet, the filter being disposed primarily in the third quadrant.

10. An apparatus according to claim 7 wherein the passage is divergent and then convergent in the direction of flow of the mixture.

11. An apparatus according to claim 7 wherein the inlet tube extends in a direction towards said curved section of the side wall and towards one end wall.

12. An apparatus according to claim 7 wherein the filter unit comprises a pleated cylinder of hydrophobic filter medium.

13. A method for separating water from an air/water mixture comprising passing the air/water mixture through the apparatus according to claim 7.

14. A method according to claim 13 further comprising removing at least 80% of the water from the air/water mixture at an accountability of at least 94%.

* * * * *